Sept. 8, 1953
J. A. MARQUARDT
2,651,250
VENTILATING SYSTEM
Filed Aug. 17, 1948
2 Sheets-Sheet 1
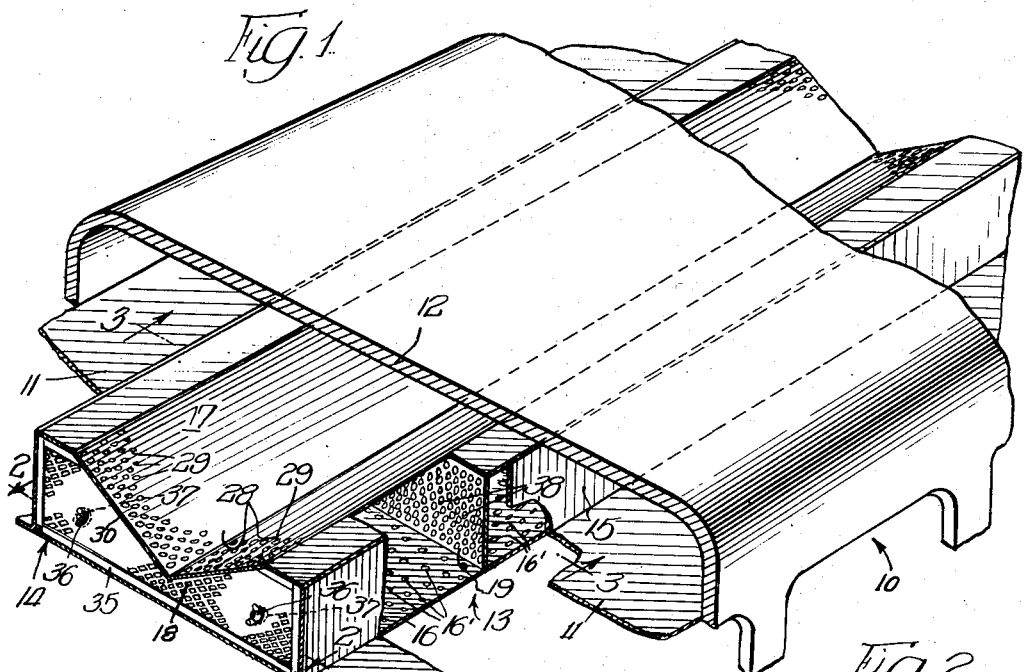
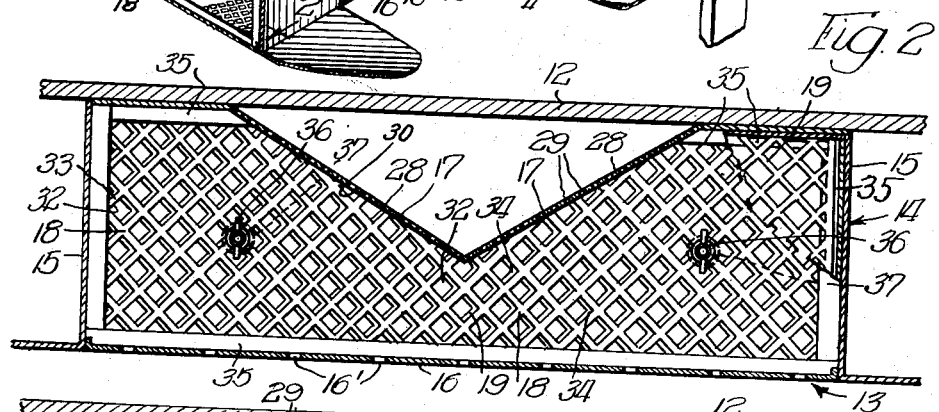
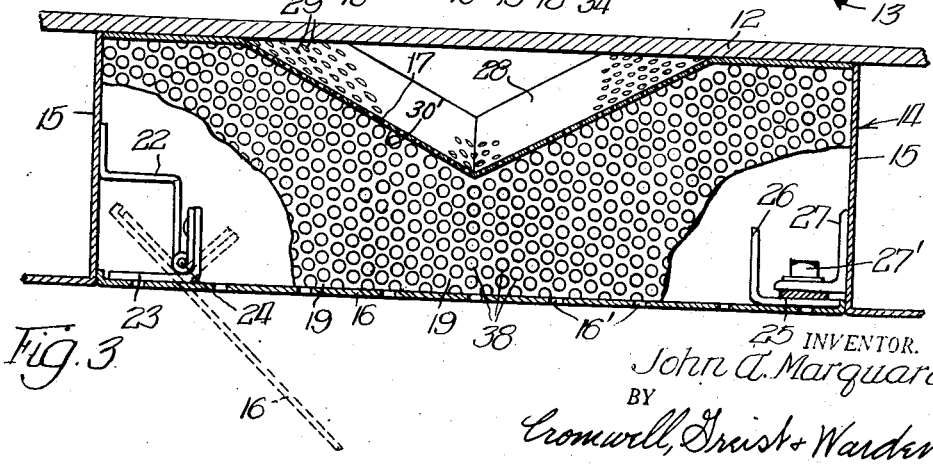
INVENTOR.
John A. Marquardt,
BY
Cromwell, Greist & Warden
ATTYS.

Sept. 8, 1953
J. A. MARQUARDT
VENTILATING SYSTEM
2,651,250
Filed Aug. 17, 1948
2 Sheets-Sheet 2
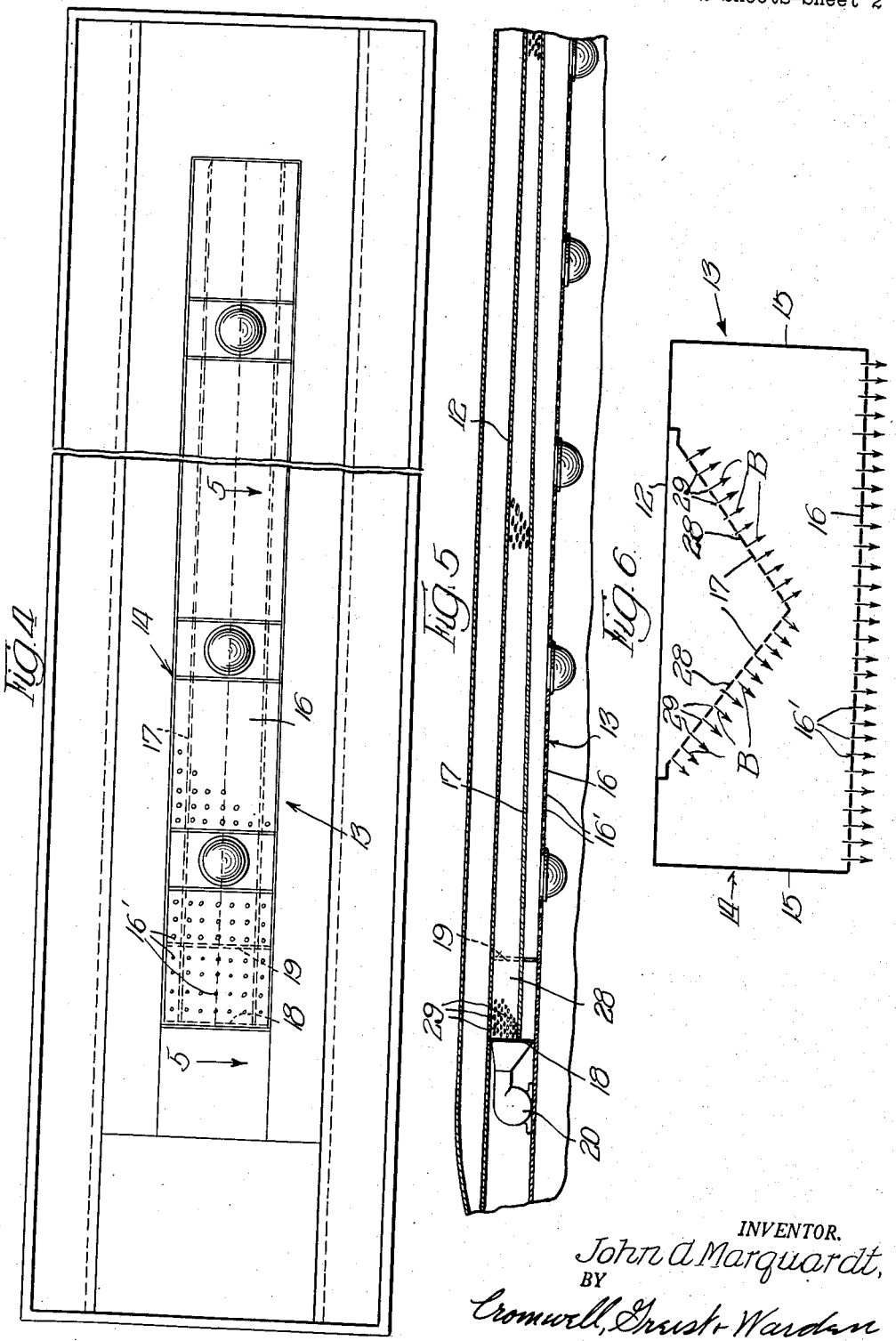
INVENTOR.
John A. Marquardt,
BY
Cromwell, Greist + Warden
Attys.

Patented Sept. 8, 1953

2,651,250

UNITED STATES PATENT OFFICE 2,651,250

VENTILATING SYSTEM

John A. Marquardt, Elmhurst, Ill., assignor, by mesne assignments, to Burgess-Manning Company, Libertyville, Ill., a corporation of Illinois Application August 17, 1948, Serial No. 44,742

19 Claims. (Cl. 98—40)

The present invention pertains to an improved ventilating system for the circulation of warm or cool air in an enclosed space, being particularly adapted and devised for installation in railway passenger cars, busses and like vehicles. However, the principles of the invention are quite widely applicable and are not limited in utility to passenger vehicle installations.

Two general methods are employed in distributing air in air conditioning and ventilating systems, namely, the velocity distribution system and the pressure distribution system. In the former, air is usually blown from grilles at sufficient velocity to traverse and distribute itself throughout the space to be conditioned, baffles and vanes being sometimes employed to control the direction of the air stream. Considerable care must be exercised in the choice or design of grilles and entering air velocity to insure that the air will travel the entire length of the space which is serviced before returning, and under any circumstance it is difficult to obtain uniform, draft free air distribution with the conventional velocity system. The present invention involves a modified and improved distribution method. Under this principle the air is caused to flow through the parallel ducts of a two-duct system and is carefully controlled and allowed to escape at low velocity to the space serviced by the unit, through openings in said duct system.

Application of the usual grille type velocity system to a railway car ventilating installation would normally present some difficulty, if only because of the relatively great length of the vehicle, hence it is a general object of the present invention to surmount this difficulty and to insure a uniform, draft-free distribution of air, heated or cool, throughout an elongated interior at a uniform temperature, ranging not more than a few degrees throughout the entire space which is served.

It is another general object of the invention to provide a simple, relatively inexpensive ventilating system or unit which eliminates the use of conventional ducts, grille and other special openings, which is readily installed in existing passenger vehicles or other locations, preferably adjacent the ceiling thereof, and which best adapts the distribution method to the efficient distribution of ventilating air in a vehicle or like interior.

A still further general object of the invention is to provide a ventilating system or unit of the foregoing character which operates on the principle of the distribution of air at very low velocity along and through a perforated ceiling area, having a multiplicity of widely distributed perforations therein, with complete freedom from drafts arising from localized, high velocity issuance of air through said ceiling area, said system employing a pair of adjacent, separate though communicating, parallel ducts extending along the ceiling and means to supply air under pressure to both of said ducts for longitudinal flow therethrough.

Yet another and more specific object of the invention is to provide a dual flow, double duct ventilating system of the foregoing type composed of various special perforated duct and baffle elements which are predeterminedly associated with one another and proportioned as to the size and amount of open area thereof so as to effect a controlled and uniform issuance and distribution of air throughout all parts of the space which is serviced.

A still further object is to provide a system of the type referred to above, in which provisions are made to cause a multiplicity of low velocity, laterally directed air jets to issue from the interior of a special, elongated, perforated and internal duct into an elongated, external, perforated duct, and to employ said jets or air streams somewhat in the manner of mechanical baffles to interrupt and deflect air traveling lengthwise of said last named duct on the external side of said internal duct, thereby to insure uniform, equal volume and low velocity issuance of ventilating air from said system throughout the entire length of the space serviced by the system.

The foregoing statements are indicative in a general way of the nature of the invention, but other and more specific objects will be apparent to those skilled in the art upon a full understanding of the construction and operation of the system.

A single embodiment of the invention whereby the above objects are attained is illustrated in the drawings, in which:

Fig. 1 is a fragmentary perspective view, partially broken away and in transverse vertical section to illustrate structural details and the relationship of the component parts of the system as operatively installed in a structure to be ventilated, for example, a railway car;

Figs. 2 and 3 are, respectively, somewhat enlarged fragmentary views in vertical transverse section along lines corresponding approximately to lines 2—2 and 3—3 of Fig. 1, Fig. 3 being partially broken away to show further structural de- Fig. 4 is a bottom plan view of the system in accordance with the invention;

Fig. 5 is a fragmentary view in vertical longitudinal section along a line corresponding approximately to line 5—5 of Fig. 4, and Fig. 6 is a schematic view illustrating one of the basic principles involved in the operation of the present system.

Referring to the drawings, the reference numeral 10 in Fig. 1 generally designates a railway car to which the system of the present invention is illustratively applied, although it is to be understood that said system is also susceptible of being installed in various other units, vehicular or otherwise. The system or unit as a whole is disposed lengthwise of the car and centrally of its width, being practically co-extensive in length therewith. The usual ceiling or upper deck of the car is designated 11, being spaced somewhat beneath the car roof 12, as illustrated in Figs. 1, 2 and 3. The duct-like ventilating unit of this invention is generally designated as a whole by the reference numeral 13; it is arranged so that its lower surface lies flush with the ceiling 11 (see Figs. 2 and 3). It is preferably closed at its rear end and at its forward end it is in receiving relation to a blower or like air supply source, as will be described.

The unit 13 is constituted by four main components. One of these is the three sided, elongated main duct 14 which is constituted by parallel, imperforate side walls 15 abutting the roof 12 at the top thereof and a bottom perforated panel 16 extending beneath said walls, the aforesaid roof serving as a fourth wall of duct 14. Another general component of the unit in the present instance is the special, rearwardly tapering trough or V-duct 17 disposed internally of and coextensive with the duct 14, opening upwardly thereof. A third basic component is a forward, vertical perforated baffle 18 arranged transversely of the duct 14 at the forward or entry end thereof, as illustrated in Fig. 1. The fourth general constituent in the present instance is a secondary vertical, transversely arranged baffle 19, which is located a few feet downstream or rearwardly of the baffle 18. These four general components are secured to one another in the relationship to be described in any conventional manner to constitute the built up ventilating unit 13. Said unit is disposed in alignment with and rearwardly spaced from a conventional blower 20 mounted in a suitable housing adjacent the forward end of the space to be ventilated. The output of said blower is directed to the forward, intake end of both ducts of the unit.

As stated above, the side walls 15 of the main duct 14 are imperforate and serve to seal said duct from the remainder of the space between roof 12 and ceiling 11 on either side thereof. The lower ceiling panel 16 of duct 14 is provided with a multiplicity of perforations 16' through which the ventilating air issues to the car interior which is serviced. This panel may comprise a plurality of sheet metal sections arranged in end to end order and appropriately supported by means disposed internally of the duct 14. It has not been deemed necessary to illustrate and describe a particular arrangement in detail, however, suitable provisions may be incorporated to enable the panel 16 to be unfastened and lowered for access to the interior of duct 14, in cleaning, etc., as illustrated in dotted lines in Fig. 3.

These provisions may take the form of an offset bracket 22 welded or otherwise affixed to a duct side wall 15, an elongated angle iron 23 secured to a section or sections of perforated panel 16 and a hinge 24 pivotally articulating said angle iron and panel with the bracket. The opposite side of the panel 16 may be provided with a compressible vibration pad 25 cemented on an elongated angle iron 26 carried by said panel, which pad is engaged against a further elongated angle iron 27 on the side wall 15. A standard type of quarter turn fastener 27' is availed of to secure the panel 16 to the duct along this side. The fastener may be manipulated through a hole in panel 16 by means of a suitable wrench or other tool.

In accordance with the invention, the panel 16 of duct 14, which panel constitutes the air distributing outlet of said duct, is uniformly perforated, as indicated by the reference numeral 16' to a sufficient extent to account for about 10% of its total face area.

The special V-duct 17 is vertically tapered along its rearwardly extending dimension to such an extent that its apex rises about 1/16 of an inch per foot of length. The taper is generally indicated in Figs. 1 and 3 and is illustrated in exaggerated degree in Fig. 5. The downwardly convergent side wall sections 28 of the duct 17 are disposed at a uniform angle of approximately 120° to one another and, since this angle is constant throughout the length of the V-duct, it is apparent that the margins of said sections taper toward one another in the rearward direction, as well as toward roof 12 (see Fig. 3). In certain installations it may be found desirable to dispense with the feature of tapering said duct.

V-duct 17 is provided with a multiplicity of small air emission openings 29, sufficient to account for roughly 1% of its entire surface area, although this percentage may vary somewhat. These openings are equally spaced on both sides of the duct.

The forward baffle 18 preferably takes the form of a perforated, grille-like sheet metal plate appropriately secured marginally to the side walls 15 of duct 14. Said baffle is flush with the forward open end of V-duct 17. Its primary purpose is to meter the proper proportions of air into the unit internally of and externally of said V-duct. Baffle 18 has a central V-shaped notch 30 which corresponds with the external outline of the V-duct and nestingly receives the latter in the operative relationship of the parts, and baffle 19 has a similar notch 30'. The baffles and ducts may be secured together by any appropriate means.

The area of the central longitudinal, V-shaped opening defined by the V-duct 17, i. e., between duct sections 28 and roof 12, represents approximately 40% of the total cross sectional area across the duct 14, the remaining 60% being represented by the overall cross sectional area of the baffle 18. This baffle is punched out to provide a multiplicity of rectangular apertures 32 defined by the intersecting strips 33, which apertures occupy about 60%–70% of the total area of the baffle when they are fully exposed to the air directed against the unit by blower 20. Accordingly, the total maximum area of opening through said baffle is about 42% of the total cross sectional area of duct 14. Hence when the openings 32 are fully exposed they pass approximately the same amount of air to the duct 14 externally of V-duct 17, as enters the latter. For practical purposes the volumes may be considered equal.

Adjustability of operation may be obtained by partially covering the openings 32 of baffle 18. A suitable means for accomplishing this may take the form of a control plate 34 similar to the baffle which is guided for sidewise movement in a suitable transverse channel or way 35 extending across duct 14. The control plate 34 abuts baffle 18 and is rendered adjustable laterally by the wing nuts 36 and washers 37 which hold it to said baffle. Upon loosening said nuts the control plate 34 may be shifted to displace its rectangular openings relative to the similar apertures 32 of said baffle, as indicated in solid lines in Fig. 2. When in maximum cut-off position the plate 34 reduces the effective air flow area through baffle 18 to about 30% of its total area, as compared to the above-mentioned 60%–70% when the plate 34 is inoperative. Sufficient clearance is provided between plate 34 and the sides of the duct 14 and V-duct to permit said lateral adjustment.

The secondary or rear baffle 19, which is the fourth basic component of the ventilating unit, is located a few feet to the rear of baffle 18 and, like the latter, is perforated at 38 to an extent sufficient to expose approximately 50% of its area for air flow therethrough. It is similar in outline to baffle 18 and is similarly secured in upright position internally of the main duct 14, extending transversely across the latter.

The foregoing structural and flow capacity relationships result in a balanced, uniform distribution of air from duct 14 when air is introduced to the unit 13 by blower 20.

No attempt has been made to reproduce exactly in the drawings the size of the hole or perforation in any of the walls, panels or baffles of the system.

In operation, assuming that said blower is supplying air to the unit at moderate velocity and in the direction of the length of the installation, about 50% thereof unimpededly enters the V-duct 17 and the remainder passes through the apertures 32 of the forward baffle 18. In traversing the V-duct at moderate velocity the air therein issues downwardly and laterally through the perforations 29 in the side panels 28 into the duct 14 in the form of a multiplicity of small air streams of considerable velocity, directed at right angles to the length of the duct. These air streams or jets travel with a certain momentum, hence they may be considered essentially as fluid barriers or baffles. The action is shown schematically in Fig. 6, in which said baffles are denoted B. They continuously impinge the larger stream of air flowing longitudinally in duct 14 on the outside of V-duct 17, throughout the entire length of its travel causing a certain amount of turbulence in that stream.

The rearward taper of said V-duct, and its resultant effect of setting up a back pressure, tends to maintain the aforesaid air baffle action uniform at all zones in duct 14. However, as stated above, the system is satisfactorily operative when the taper is omitted. In any embodiment, the normal tendency of the air which is supplied externally of V-duct 17 to flow the entire length of the unit before issuing through the perforations 16' of the lowermost panel 16 is interrupted and counteracted by the aforesaid air baffles and turbulence. The result is that portions of the moving air in duct 14 are continually deflected downwardly, throughout its entire length, and caused to issue through perforated panel 16 at very low velocity. The adjustment afforded by the control plate 34 enables the system to be regulated easily to meet all conditions of operation.

The secondary perforated baffle 19 is provided for the purpose of mechanically baffling the air flow to the duct 14, i. e., to moderate the velocity of flow adjacent the immediate entry zone of the unit and thereby prevent aspiration. As distinguished from this, the essential function of the forward baffle 18 is a metering one, insuring that an adequate portion (roughly half) of the air supplied by the blower 20 enters the V-duct 17.

As will be evident from the foregoing description, the present system operates on the general principle of employing a multiplicity of fluid air baffles, set up by a stream of air flowing longitudinally of one duct, which baffles coact with a further air stream in another duct across which they flow to cause air to be distributed from the ventilating unit in uniformly distributed volume and at constant velocity. These fluid baffles are, in effect, the equivalent of a great multiplicity of very carefully placed and apportioned mechanical baffles, such as would be called for in a system operating according to the conventional theory of air distribution. The advantages of the present unit over such a complex mechanical baffling unit from the standpoints of cost of installation, engineering experimentation, etc., are clear. Other advantages in factors of draft free operation, uniform temperature maintenance and the like are also obtained.

Those skilled in the art will perceive the possibility and perhaps the desirability of various alterations in detail or arrangement of the features of the above described unit, without departing from the principles of the invention as referred to above. It is therefore intended that the invention be construed as broadly as is consistent with the spirit of the accompanying claims.

I claim:

1. A ventilating structure comprising a pair of elongated air flow ducts, both of which are provided with perforated lower members, one of said ducts being housed within the other, the lower member of the internal duct being constituted by downwardly and inwardly convergent portions, and a perforated baffle disposed transversely of and in flow obstructing relation to the outermost duct, the cross-sectional area of said internal duct being relatively unobstructively exposed to longitudinal flow of air thereinto in the zone thereof adjacent said baffle.

2. A ventilating structure comprising a pair of elongated air flow ducts, both of which are provided with perforated lower members, one of said ducts being housed within the other in a vertically spaced relationship of said respective lower members, the lower member of the internal duct being constituted by downwardly and inwardly convergent portions, and a perforated baffle disposed transversely of and in flow obstructing relation to the outermost duct, the cross-sectional area of said internal duct being relatively unobstructedly exposed to longitudinal flow of air thereinto in the zone thereof adjacent said baffle.

3. A ventilating structure comprising a pair of elongated air flow ducts, both of which are provided with perforated lower members, one of said ducts being housed within the other in a vertically spaced relationship of said respective lower members, the lower member of the internal duct being constituted by downwardly and inwardly convergent portions, and a perforated baffle disposed transversely of and in flow obstructing relation to the outermost duct, the cross-sectional area of said internal duct being relatively unobstructedly exposed to longitudinal flow of air thereinto the zone thereof adjacent said baffle and approximating in size the total area of the perforations of said baffle.

4. A ventilating structure comprising a pair of elongated air flow ducts, both of which are provided with perforated air emission members, one of said ducts being housed within the other in a vertically spaced relationship of said respective air emission members, the perforations of the air emission member of the internal duct opening downwardly and sidewise to the interior of the outermost duct, and a perforated baffle disposed transversely and in flow obstructing relation to the outermost duct, the cross-sectional area of said internal duct being relatively unobstructedly exposed to longitudinal flow of air thereinto in the zone thereof adjacent said baffle.

5. A ventilating structure comprising a pair of elongated ducts both of which are provided with perforated lower members, one of said ducts being housed within the other in a vertically spaced relationship of said respective lower members, the lower surface of the internal duct being constituted by downwardly and inwardly convergent portions disposed in a V-shaped relation, a perforated baffle disposed transversely of and in flow obstructing relation to the outermost duct, said internal duct being unobstructedly exposed to longitudinal flow of air thereinto in the zone thereof adjacent said baffle, and a further perforated baffle disposed in similar, transverse relation to said outermost duct and spaced longitudinally from said first named baffle.

6. A ventilating structure comprising a pair of elongated ducts both of which are provided with perforated lower members, one of said ducts being housed within the other in a vertically spaced relationship of said respective lower members, the lower member of the internal duct being constituted by downwardly and inwardly convergent portions disposed in a V-shaped relation, a perforated baffle disposed transversely of and in flow obstructing relation to the outermost duct, said internal duct being unobstructedly exposed to longitudinal flow of air thereinto in the zone thereof adjacent said baffle and being of a cross sectional area approximating the total area of the perforations of said baffle, and a further perforated baffle disposed in similar, transverse relation to said outermost duct and spaced longitudinally from said first named baffle.

7. A ventilating structure comprising a pair of elongated ducts both of which are provided with perforated lower members, one of said ducts being housed within the other in a vertically spaced relationship of said respective lower members, the lower member of the internal duct being constituted by downwardly and inwardly convergent portions disposed in a V-shaped relation, a perforated baffle disposed transversely of and in flow obstructing relation to the outermost duct, said internal duct being unobstructedly exposed to longitudinal flow of air thereinto in the zone thereof adjacent said baffle and being of a cross sectional area approximating the total area of the perforations of said baffle, and a further perforated baffle disposed in similar, transverse relation to said outermost duct and spaced rearwardly from said first named baffle, said internal duct tapering longitudinally and converging along its length to a substantially reduced cross sectional area.

8. A ventilating structure comprising a pair of elongated, enclosed parallel ducts, both having perforated lower members, one of said ducts being housed within the other and the perforations of the lower member of the internal duct being disposed to open laterally and downwardly for the discharge of air therefrom at an oblique downward angle across the outermost duct, a perforated baffle disposed transversely of and in flow obstructing relation to the outermost duct, said internal duct being relatively unobstructedly exposed to longitudinal flow of air thereinto in the zone thereof adjacent said baffle.

9. A ventilating structure comprising a pair of elongated, enclosed parallel ducts, both having perforated lower members, one of said ducts being housed within the other in a vertically spaced relationship of said respective lower members, the perforations of the lower member of the internal duct being disposed to open laterally and downwardly for the discharge of air therefrom at an oblique downward angle across the outermost duct, a perforated baffle disposed transversely of and in flow obstructing relation to the outermost duct, said internal duct being relatively unobstructedly exposed to longitudinal flow of air thereinto in the zone thereof adjacent said baffle.

10. A ventilating structure comprising a pair of elongated, enclosed parallel ducts both having perforated lower members, one of said ducts being housed within the other in a vertically spaced relationship of said respective lower members, the perforations of the lower member of the internal duct being disposed to open laterally and downwardly for the discharge of air therefrom at an oblique downward angle across the outermost duct, a perforated baffle disposed transversely of and in flow obstructing relation to the outermost duct, said internal duct being relatively unobstructedly exposed to longitudinal flow of air thereinto in the zone thereof adjacent said baffle and, means to adjust the effective area of opening through said baffle.

11. A ventilating structure comprising a pair of elongated, enclosed parallel ducts, both having perforated lower members, one of said ducts being housed within the other in a vertically spaced relationship of said respective lower members, the perforations of the lower member of the internal duct being disposed to open laterally and downwardly for the discharge of air therefrom at an oblique downward angle across the outermost duct, a perforated forward baffle disposed transversely of and in flow obstructing relation to the outermost duct, said internal duct being relatively unobstructedly exposed to longitudinal flow of air thereinto in the zone thereof adjacent said baffle, means to adjust the effective area of opening through said baffle, and a further perforated baffle in similar, transversely disposed relation to said outermost duct, said further baffle being spaced longitudinally from said first named baffle.

12. A ventilating system comprising an elongated open-ended, laterally enclosed duct of substantial cross sectional area at the open end thereof, said duct having a generally horizontal discharge panel which is provided with a multiplicity of small downwardly opening discharge apertures, a second elongated, open-ended duct of generally V-shaped cross section disposed longitudinally in said first duct, the convergent side panels of said V-duct being provided with perforations opening to said first duct, a perforated forward transverse baffle disposed across said first duct adjacent said open end thereof, the cross-sectional area of said V-duct being unobstructedly exposed to longitudinal flow of air thereinto in the zone thereof adjacent said baffle, and a secondary perforated baffle disposed transversely of said first duct and externally of said V-duct in longitudinally spaced relation to said forward baffle, said V-duct being adapted to receive air at the open end thereof for lateral and downward issue in jet form through the perforations of said V-duct panels, thereby to baffle the flow of air along said first duct externally of said V-duct.

13. A ventilating system comprising an elongated, open-ended, laterally enclosed duct of substantial cross sectional area at the open end thereof, said duct having a generally horizontal discharge panel which is provided with a multiplicity of small downwardly opening discharge apertures, an elongated, open-ended duct of generally V-shaped cross section disposed longitudinally in said first duct in vertically spaced relation above said discharge panel, the convergent side panels of said V-duct being provided with perforations opening to said first duct and being tapered toward one another and longitudinally along their length whereby to converge to a substantially reduced cross-sectional area, a perforated forward transverse baffle disposed across said first duct adjacent said open end thereof, the cross sectional area of said V-duct being unobstructedly exposed to longitudinal flow of air thereinto in the zone thereof adjacent said baffle and approximating in size that portion of the overall area of said baffle which is represented by the perforations therein, and a secondary perforated baffle disposed transversely of said first duct and externally of said V-duct in longitudinally spaced relation to said forward baffle, said V-duct being adapted to receive air at the open end thereof for lateral and downward issue in jet form through the perforations of said V-duct panels, thereby to baffle the flow of air along said first duct externally of said V-duct.

14. A ventilating system comprising an elongated, open-ended, laterally enclosed duct of substantial cross sectional area at the open end thereof, said duct having a generally horizontal discharge panel which is provided with a multiplcity of small downwardly opening discharge apertures, an elongated, open-ended duct of generally V-shaped cross section disposed longitudinally in said first duct, the convergent side panels of said V-duct being provided with perforations opening to said first duct, a perforated forward transverse baffle disposed across said first duct adjacent said open end thereof, the cross sectional area of said V-duct being unobstructedly exposed to longitudinal flow of air thereinto in the zone thereof adjacent said baffle, a secondary perforated baffle disposed transversely of said first duct and externally of said V-duct in longitudinally spaced relation to said forward baffle, said V-duct being adapted to receive air at the open end thereof for lateral and downward issue in jet form through the perforations of said V-duct panels, thereby to baffle the flow of air along said first duct externally of said V-duct, and means to regulate the total effective area of air flow opening through the first mentioned baffle.

15. A ventilating system comprising an elongated, open-ended, laterally enclosed duct of substantial cross sectional area at the open end thereof, said duct having a generally horizontal discharge panel which is provided with a multiplicity of small downwardly opening discharge apertures, an elongated, open-ended duct of generally V-shaped cross section disposed longitudinally in said first duct, the convergent side panels of said V-duct being provided with perforations opening to said first duct, a perforated forward transverse baffle disposed across said first duct adjacent said open end thereof, the cross sectional area of said V-duct being unobstructedly exposed to longitudinal flow of air thereinto in the zone thereof adjacent said baffle, a secondary perforated baffle disposed transversely of said first duct and externally of said V-duct in longitudinally spaced relation to said forward baffle, said V-duct being adapted to receive air at the open end thereof for lateral and downward issue in jet form through the perforations of said V-duct panels, thereby to baffle the flow of air along said first duct externally of said V-duct, and means to regulate the total effective area of air flow opening through said forward baffle.

16. A ventilating system comprising an elongated, open-ended, laterally enclosed first duct of substantial cross sectional area at the open end thereof, said duct having a generally horizontal discharge panel which is provided with a multiplicity of small downwardly opening discharge apertures, an elongated, open-ended duct of generally V-shaped cross section disposed longitudinally in said first duct in vertically spaced relation above said discharge panel, the convergent side panels of said V-duct being provided with perforations opening to said first duct and being tapered toward one another longitudinally along their length whereby to converge to a substantially reduced cross-sectional area, a perforated forward transverse baffle disposed across said first duct adjacent said open end thereof, the cross sectional area of said V-duct being unobstructedly exposed to longitudinal flow of air thereinto in the zone thereof adjacent said baffle and approximating in size that portion of the area of said baffle which is represented by the perforations therein, a secondary perforated baffle disposed transversely of said first duct and externally of said V-duct in longitudinally spaced relation to said forward baffle, said forward baffle and V-duct being adapted to receive air at the open end thereof for lateral and downward issue in jet form through the perforations of said V-duct panels, thereby to baffle the flow of air along said first duct externally of said V-duct, and means to regulate the total effective area of air flow opening through the first mentioned baffle.

17. A ventilating structure comprising a pair of adjacent, parallel, elongated ducts which are substantially coextensive in length and are separated from one another by an air-pervious wall portion common to both thereof, said ducts having adjacent forward ends open and exposed at a common intake plane for the reception of parallel streams of air flowing rearwardly along the length of both thereof, said air-pervious wall portion causing transverse jets to issue from one of said ducts into the other at an angle to the direction of air flow in the latter, said other duct having an air-pervious wall portion exposed to an external space to be ventilated, said last mentioned air pervious wall portion having a multiplicity of widely distributed perforations therein, and baffle means in said other duct at substantially said common intake plane.

18. A ventilating structure comprising a pair of adjacent, parallel, elongated ducts which are substantially coextensive in length and are separated from one another by an air-pervious wall portion common to both thereof, said ducts having adjacent forward ends open and exposed at a common intake plane for the reception of parallel streams of air flowing rearwardly along the length of both thereof, said air-pervious wall portion causing transverse jets to issue from one of said ducts into the other at an angle to the direction of air flow in the latter, said other duct having an air-pervious wall portion exposed to an external space to be ventilated, said first mentioned air pervious wall portion having a multiplicity of widely distributed perforations therein, and plural baffle means disposed in and spaced along the length of said other duct to control the air flow therein, one of said baffle means being arranged substantially at said common intake plane.

19. A ventilating structure for a space to be ventilated having a ceiling, comprising a pair of adjacent, parallel, elongated ducts which are substantially coextensive in length and are separated from one another by an air-pervious wall portion common to both thereof, said ducts having adjacent forward ends open and exposed at a common intake plane for the reception of parallel streams of air flowing rearwardly along the length of both thereof, unitary means associated with the forward ends of said ducts to cause streams of air to enter and traverse both thereof, said air-pervious wall portion causing transverse jets to issue from one of said ducts into the other at an angle to the direction of air flow in the latter, said other duct having an air-pervious wall portion exposed to an external space to be ventilated, said air-pervious wall portions each having a multiplicity of widely distributed perforations therein, the perforated area of the first mentioned wall portion being less than the perforated area of the second mentioned wall portion and said air-pervious wall portion exposed to the external space being substantially flush with and forming a part of the ceiling, and means for proportioning the amounts of said air entering said ducts respectively.

JOHN A. MARQUARDT.

References Cited in the file of this patent

UNITED STATES PATENTS

| Number | Name | Date |
|---|---|---|
| 1,660,758 | Miller | Feb. 28, 1928 |
| 1,863,949 | Stewart | June 21, 1932 |
| 1,999,148 | Anderson | Apr. 23, 1935 |
| 2,033,069 | Hagen et al. | Mar. 3, 1936 |
| 2,093,306 | Carson | Sept. 14, 1937 |
| 2,155,632 | Anderson | Apr. 25, 1939 |
| 2,199,341 | Henney | Apr. 30, 1940 |
| 2,204,114 | Anderson | June 11, 1940 |
| 2,218,190 | Anderson | Oct. 15, 1940 |
| 2,251,682 | Leadbetter | Aug. 5, 1941 |
| 2,304,628 | Damerel | Dec. 8, 1942 |
| 2,340,252 | Palmer | Jan. 25, 1944 |
| 2,422,560 | Palmer | June 17, 1947 |
| 2,422,782 | Hemming | June 24, 1947 |
| 2,424,828 | Keep | July 29, 1947 |